United States Patent [19]

Cappetti et al.

[11] 3,728,492

[45] Apr. 17, 1973

[54] TRAFFIC CONCENTRATOR FOR TELECOMMUNICATION SYSTEM WITH TREE STRUCTURE

[75] Inventors: Ilio Cappetti; Flavio Melindo; Giovanni Perucca, all of Turin, Italy

[73] Assignee: Centro Studi e Laboratori Telecommunicazioni S.P.A., Turin, Italy

[22] Filed: Sept. 10, 1970

[21] Appl. No.: 71,084

[30] Foreign Application Priority Data

Sept. 12, 1969 Italy ........53316 A/69

[52] U.S. Cl. ........179/18 FC, 179/15 AL, 179/15 BY

[51] Int. Cl. ........H04j 3/12

[58] Field of Search ........179/18 FC, 15 AL, 179/15 BY; 178/4.1 R

[56] References Cited

UNITED STATES PATENTS

| | | | |
|---|---|---|---|
| 3,549,820 | 12/1970 | Knollman | 179/99 |
| 3,558,827 | 1/1971 | Lucas et al. | 179/15 BY |
| 3,548,108 | 12/1970 | Yamato et al. | 179/15 BY |
| 3,245,043 | 4/1966 | Gaffney, Jr. et al. | 178/4.1 R |
| 2,651,677 | 9/1953 | Lair | 179/15 AL |
| 3,271,521 | 9/1966 | Sanden et al. | 179/15 BY |

*Primary Examiner*—Thomas W. Brown
*Attorney*—Karl F. Ross

[57] ABSTRACT

A telephone system with a plurality of subscriber lines branched off a common trunk line with a number of parallel channels less than the number of subscriber lines includes a single service line extending from a terminal station to all the subscriber stations for the exchange of call, switching and disconnect signals. Each subscriber station is allotted a time slot in a scanning cycle established at the central office by a master clock and characterized by a relatively wide starting pulse followed by a series of relatively narrow address pulses each initiating a signaling interval assigned to a respective subscriber. A timer at a subscriber station, responding to the starting pulse, measures a delay period individual to that station at the end of which the assigned address pulse starts a slave clock conditioning the subscriber station for the transmission and reception of signals during specific phases of its time slot and for the seizure or release of a channel of the trunk line in response thereto.

9 Claims, 5 Drawing Figures

Ilio Cappetti
Flavio Melindo
Giovanni Perucca
INVENTORS.

BY

Karl F. Ross
Attorney

Ilio Cappetti
Flavio Melindo
Giovanni Perucca
INVENTORS.

BY

Karl F. Ross
Attorney

Ilio Cappetti
Flavio Melindo
Giovanni Perucca
INVENTORS.

BY
Karl F. Ross
Attorney

INVENTORS:
Ilio Cappetti
Flavio Melindo
Giovanni Perucca

BY

Karl F. Ross
Attorney

TRAFFIC CONCENTRATOR FOR TELECOMMUNICATION SYSTEM WITH TREE STRUCTURE

Our present invention relates to a traffic concentrator for telephone or other telecommunication systems wherein a number of local lines branch off a common trunk line at different locations so as to constitute a communication network of treelike structure.

Conventional traffic concentrators, designed to establish communication between a central office and a multiplicity of outlying stations (hereinafter referred to as subscriber stations) scattered throughout an area in need of relatively infrequest service, include a generally star-shaped network of local lines radiating from a common junction to the several subscriber stations, this junction being connected to the associated central office by way of a trunk line with a number of parallel channels (such as pairs of metallic conductors or different frequency bands carried by a coaxial cable) whose number is substantially less than the number of local lines served thereby. Such a network configuration, however, is not practical in certain instances where the several subscriber stations are disposed in a generally linear array, e.g. along a highway, river, shoreline, railroad track, mountain trail or electric power line.

The general object of our present invention is to provide a traffic concentrator suitable for such a linear telecommunication system.

A more specific object is to provide a tree-shaped communication network of this type wherein all subscriber stations may have relatively simple and substantially identical circuitry and wherein all switching operations are controlled and monitored from a common terminal with effective safeguards against possible malfunction.

A related object is to minimize the consumption of electric energy at the several subscriber stations so as to enable their energization from a common power supply at a such terminal.

A telecommunication system according to the present invention, operating on the principle of traffic concentration as outlined above, includes a common service line interconnecting the terminal equipment of the central office and the several subscriber stations sharing a common trunk line, this service line being connected at the terminal station to primary signaling means for periodically addressing each subscriber station in a code individual thereto and at each subscriber station to secondary signaling means responsive to command signals from the terminal station to control the associated switch means for establishing or discontinuing a connection between a subscriber station so addressed and the trunk line.

If the number of subscribers is very small and/or the traffic density is low, the trunk line may provide only a single channel. In the more general case, there will be a plurality of such chennels each accessible to any of the more numerous subscriber lines.

In an advantageous embodiment, the code utilized for the selective addressing of the several subscriber stations is the time position of an address pulse in a scanning cycle initiated by a starting pulse which is characteristically different from the address pulses (preferably of greater width) and which is periodically emitted by the terminal equipment. The several address pulses divide the scanning cycle into a plurality of time slots of predetermined duration individually allotted to each subscriber station; at a given subscriber station, a decoder responsive to arrival of the starting pulse measures a time interval individual to that station for conditioning its circuitry to respond to the assigned address pulse at the end of the measured interval. This address pulse, in turn, starts a slave clock circuit at the subscriber station to measure the length of the time slot as established by a master clock circuit at the terminal station, the two clock circuits being substantially synchronized so that information can now be exchanged between the terminal and the subscriber station in the form of further pulses having a characteristic time position within the allotted time slot. The information so exchanged may include signals transmitted from the subscriber station to the terminal to indicate that a subscriber is ready to initiate a call or that the station is busy, i.e. has seized a channel of the trunk line; other signals, transmitted from the terminal over the service line in the allotted time slot, may identify an available channel to be seized by the subscriber station in response to a request signal from that station or in the presence of an incoming call from another subscriber.

According to another feature of our invention, the terminal equipment is provided with means for monitoring the several channels of the trunk line to determine their idle or engaged state. If a channel previously seized by a subscriber station is found to be idle, yet if that station continues to send a busy signal over the service line as determined by a verification circuit also connected with the monitoring means, a disconnect signal is transmitted to the subscriber station within the allotted time slot to release the channel. The channel-identifying signal, commanding seizure, and the disconnect signal, commanding release, may be transmitted within the same specific phase of the allotted time slot and may be distinguished from each other by the fact that the identifying signal is a single pulse (or a combination of a few pulses) in a given time position assigned to the corresponding channel whereas the disconnect signal is a train of such pulses coinciding with all the available time positions, a storage circuit responsive to the cumulative pulse energy of the disconnect signal discriminating between the latter and the seizure command.

The above and other features of our invention will be described in greater detail with reference to the accompanying drawing in which.

Figure 1:
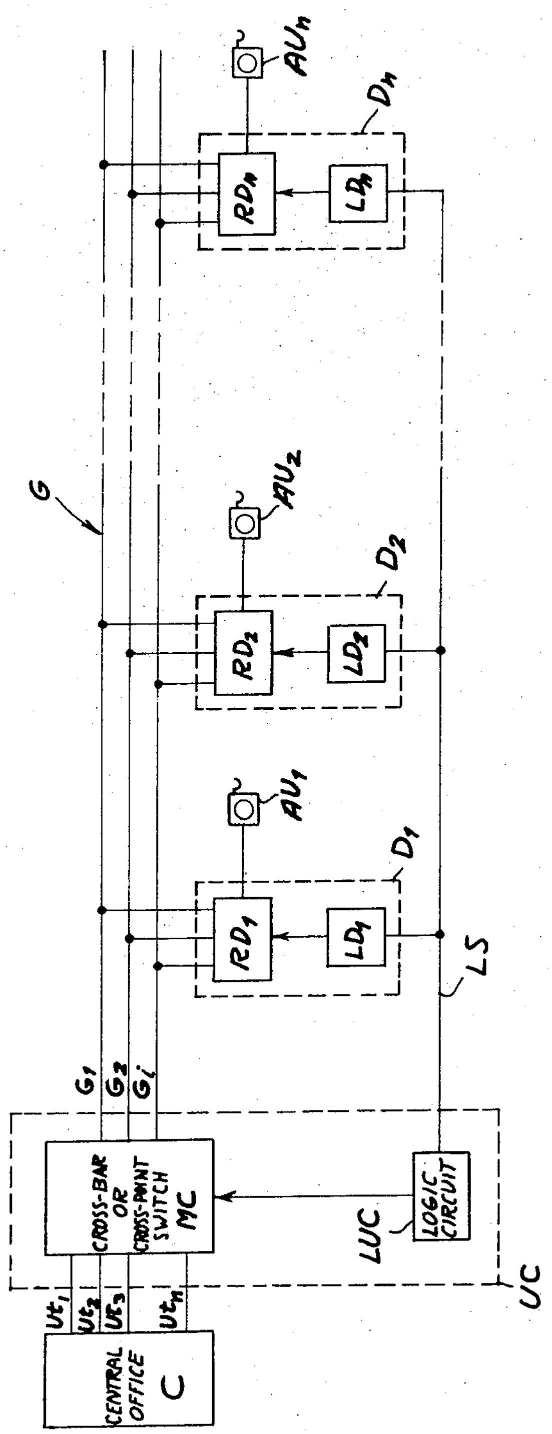
FIG. 1 is a diagrammatic view showing the overall layout of a telephone system embodying our invention.

The system shown in FIG. 1 comprises a terminal station including central-office equipment C and a switching network generally designated UC, this network being shown divided into a conventional cross-bar or cross-point switch MC and associated logic circuitry LUC. Unit C is connected to cross-bar switch MC, in a manner more fully described hereinafter with reference to FIG. 5, through a multiplicity of links $Ut_1$, $Ut_2$, $Ut_3$, . . . $Ut_n$ pertaining to as many subscriber stations $D_1$, $D_2$, . . . $D_n$ provided with respective telephone sets $AU_1$, $AU_2$, . . . $AU_n$. Stations $D_1 - D_n$ are connected to different branching points along a common trunk line G forming a lesser number $i$ of parallel channels $G_1$, $G_2$, . . . $G_i$.

Each subscriber station is shown to include logic $LD_1$, $LD_2$, . . . $LD_n$ and a relay circuit $RD_1$, $RD_2$, . . . $RD_n$ for selectively connecting the corresponding telephone set to any one of the several channels $G_1 - G_i$. The logic circuits LUC and $LD_1 - LD_n$ are all interconnected by a common service line LS which intervenes in the exchange of switching signals between the terminal and subscriber stations and which also supplies electrical energy from the terminal station to the subscribers as likewise described in greater detail below.

The leads $Ut_1 - Ut_n$ serve for the transmission of dial pulses or equivalent selection signals, received via trunk line G, from any calling subscriber to exchange C in a manner well known *per se* and therefore not described in detail; the same leads are used for transmitting to the unit UC a call signal identifying any of the several subscribers stations $D_1 - D_n$ on an incoming call to such station from any other station associated with trunk line G or otherwise served by the exchange C. Leads $UT_1 - UT_n$ also serve for message transmission.

Figure 2:
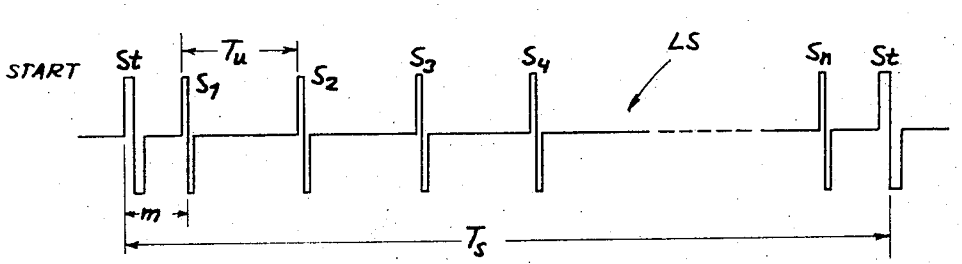
FIG. 2 is a graph of a series of pulses transmitted during a scanning cycle from a terminal station forming part of the system of FIG. 1.

FIG. 2 illustrates a train of pulses defining a scanning cycle $T_s$, this cycle beginning with a relatively wide starting pulse St and including a multiplicity of address pulses $S_1 - S_n$ allocated to the several subscriber stations $D_1 - D_n$. The period $T_u$ between successive address pulses represents a time slot allotted to the respective subscriber station; it will be noted that the starting pulse St occurs in the latter part of the time slot of station $D_n$, within a so-called guard interval $T_{IV}$ thereof (FIG. 3) during which no information is being transmitted over line LS.

Figure 3:
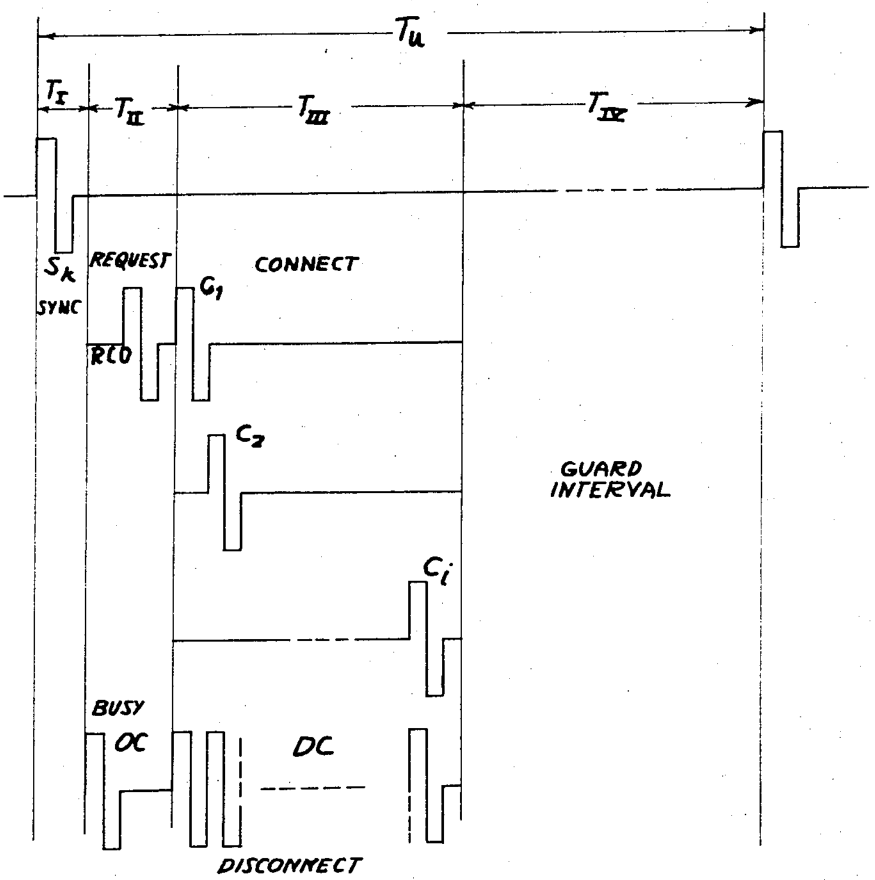
FIG. 3 is a set of graphs showing different types of signals adapted to be exchanged between the terminal station and a subscriber station during a scanning cycle allotted thereto.

With the address pulses $S_1$, $S_2$ etc. characteristically spaced from starting or reference pulse St, each subscriber station can effectively discriminate against all address pulses assigned to other stations by measuring a interval $m + (k-l)T_u$ where $m$ is the invariable spacing between pulses $St$ and $S_1$ whereas $k$ represents the corresponding subscript ranging between $l$ and $n$. FIG. 3 shows such a time slot divided into four distinct phases $T_I$, $T_{II}$, $T_{III}$ and $T_{IV}$, the last one constituting the aforementioned guard interval designed to prevent cross-talk in the event of incomplete synchronization of the clock circuits at the terminal station and at the several subscriber stations. Phase $T_I$ is reserved for the transmission and reception of the address pulse $S_k$ whose arrival at station $D_k$ initiates the measurement of the allotted time slot having the total duration $T_u$. Phase $T_{II}$ is used for the retransmission of signals from the subscriber station to the terminal, these signals being characterized by their time positions within phase $T_{II}$ as either a request signal RCO, indicating that the subscriber at the outlying station has lifted the receiver to initiate a call, or a busy signal OC, indicating operation of one of the associated switching relays to seize one of the channels of trunk line G (FIG. 1). Phase $T_{III}$ is reserved for the selective transmission of channel-identifying pulses $C_1$, $C_2$, . . . $C_i$, characterized by their time positions within that phase, and of a train of pulses DC coinciding with all these time positions, this pulse train representing a disconnect signal. It may be mentioned that the selection of an available channel could be indicated by code combinations of two or more pulses, rather than by a single pulse as shown, and that in such a case the number of time positions reserved for these channel-identifying pulses may be considerably less than the number $i$ of these channels.

During the guard interval $T_{IV}$, which may extend over more than half the duration $T_u$ of a time slot, the circuits of station $D_k$ are inoperative so as not to respond to pulses on line LS destined for other subscriber stations but falling within the time slot established by station $D_k$, owing to inadequate synchronization.

Figure 4:
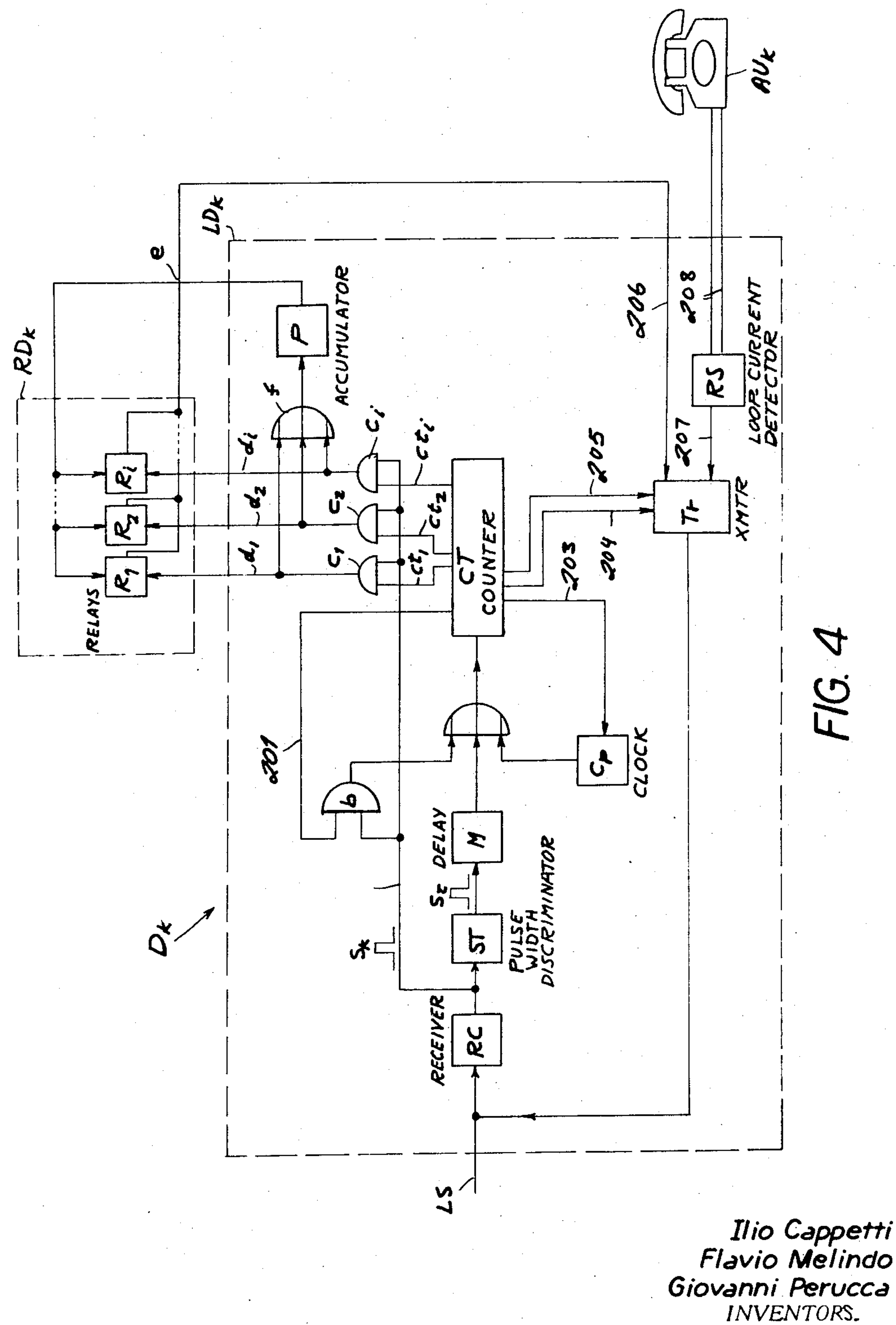
FIG. 4 is a block diagram of the circuitry of a subscriber station forming part of the system.

FIG. 4 shows details of the subscriber station $D_k$, including the telephone set $AU_k$, the logic $LD_k$ and the relay circuit $RD_k$ thereof. Logic $LD_k$ includes a receiver RC and a transmitter Tr both connected to service line LS; since transmitter $Tr$ operates only during phase $T_{II}$ whereas the output of receiver RC is ineffectual except during phases $T_I$ and $T_{III}$, no special precaution is required to prevent the transmitter output from reaching the input of the receiver.

Receiver RC works into a pulse-width discriminator ST which detects the relatively wide starting pulse St at the beginning of any scanning cycle and, in response thereto, triggers a delay line or circuit M measuring the aforementioned interval $m + (k-l)T$ at the end of which a timing pulse appears in its output and is transmitted to a counter CT via an OR gate $a$. On the trailing edge of this timing pulse, counter CT via a line 201 energized an input of an AND gate $b$ in time for the arrival of the corresponding address pulse $S_k$ which is fed from receiver RC over a lead 202 to the other input of AND gate $b$ so that a further timing pulse is transmitted through OR gate $a$ to counter CT. The trailing edge of this latter pulse starts a clock circuit $C_p$ feeding a predetermined number of clock pulses by way of OR gate $a$ to counter CT; the occurrence of these clock pulses coincides with the several time positions for pulses OC, RCO and $C_1 - C_i$ described in connection with FIG. 3. Clock circuit $C_p$ stops upon the return of counter CT to its zero position.

Counter CT has two further outputs 204, 205 responding to the first two clock pulses from unit Cp to open respective gates (not shown) in transmitter Tr for the passage of signals from relay circuit $RD_k$ over a lead 206 and from telephone set $AU_k$ over a lead 207 to service line LS.

The first of these signals indicates actuation of any one of several relays $R_1$, $R_2$, . . . $R_i$ in circuit $RD_k$, each of these relays being assigned to a respective channel of trunk line G and serving to connect this channel to the talking wires (not shown) of telephone apparatus $AU_k$ for the transmission and reception of messages over the trunk. Relays $R_1 - R_i$ are advantageously of the magnetically latched type requiring energization only for switchover from an unactuated to an actuated state or *vice versa*. Thus, concurrent energization of leads 204 and 206 results in the appearance of a busy pulse OC (FIG. 3) on line LS.

The signal on lead 207 emanates from a voltage generator RS connected in the line loop 208 of telephone set $AU_k$. Closure of this loop by the usual hook switch, upon a lifting of the receiver by a subscriber wishing to initiate or to start a call, is thus reported to the central office C (FIG. 1) by the concurrent energization of leads 205 and 207, resulting in a request pulse RCO (FIG. 3) transmitted via line LS to terminal UC.

Next, the continuing generation of clock pulses by unit C*p* steps the counter CT to energize a succession of leads $ct_1, ct_2, \ldots ct_i$ each terminating at one input of an associated AND gate $c_1, c_2, \ldots c_i$ whose other input is connected to lead 202. The outputs $d_1, d_2, \ldots d_i$ of these AND gates are connected on the one hand to respective operating windings (not shown) of the corresponding relays $R_1, R_2, \ldots R_i$ and on the other hand, through an OR gate *f*, to a voltage accumulator P whose output lead *e* feeds all the restoring windings (also not shown) of these relays. Thus, if a channel-identifying pulse (e.g. $C_1$, FIG. 3) arriving over line LS appears on lead 202 simultaneously with the energization of the corresponding output lead (e.g. $ct_1$) of counter CT, the associated AND gate (such as gate $c_1$) conducts and trips the respective relay ($R_1$) to seize the channel ($G_1$, FIG. 1) so identified. The brief energization of a signal conductor $d_1 - d_i$ by such a command pulse, even if repeated in succession of scanning cycles, is insufficient to generate an output on lead *e* capable of restoring any previously actuated relay; such an output, however, comes into existence in response to a train of disconnect pulses DC (FIG. 3) which energize the leads $d_1 - d_i$ in rapid succession and build up a charge in voltage accumulator P of a magnitude sufficient to release the seized channel.

Figure 5:
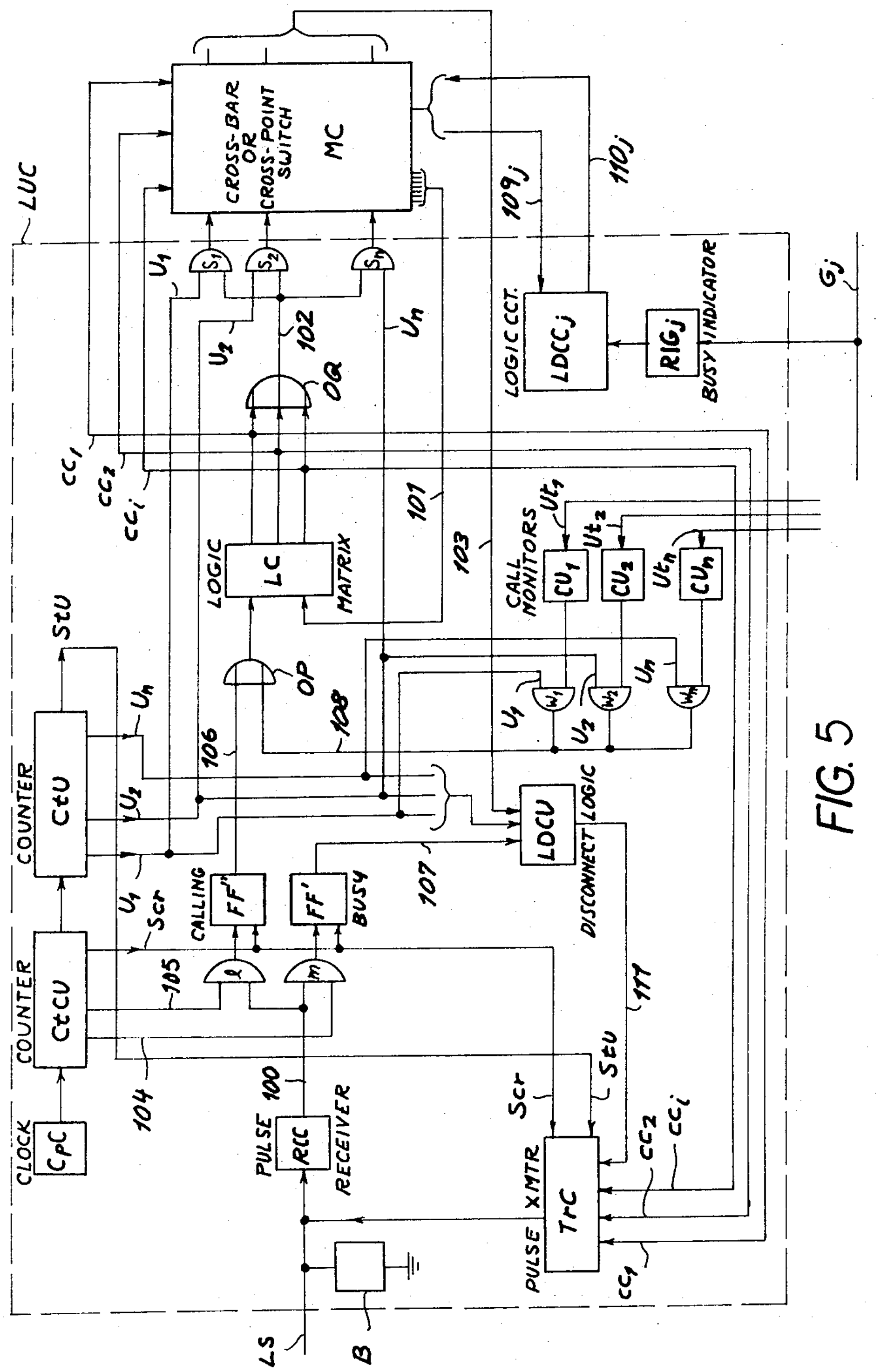
FIG. 5 is a similar block diagram showing the circuitry of the terminal station.

All the active circuit elements of station $D_k$, including units RS, and $RD_k$, receive their operating energy from service line LS via connections not further illustrated, this service line being connected at the terminal to a power supply illustrated in FIG. 5 as a battery B.

FIG. 5 further shows details of logic network LUC which includes a master clock circuit C*p*C working into a pulse counter C*t*CU generally similar to counter CT of FIG. 4. Counter C*t*CU, in turn, steps a second counter C*t*U whose output lead StU is periodically energized to deliver the starting pulse St (FIG. 2) to service line LS by way of transmitter T*r*C. Line LS is also connected to the input of a pulse receiver RCC whose output lead 100 is connected in parallel to respective inputs of a pair of AND gates *l*, *m* having other inputs connected to output leads 104, 105 of counter C*t* CU.

Counter C*t*CU is periodically reset and restarted to energize, successively, the leads 104 and 105 as well as a further lead, S*cr*, the pulses on the latter lead appearing on line LS as address pulses $S_1 - S_n$ shown in FIG. 2. Upon the generation of each address pulse, counter C*t*U is advanced by one step representing a time slot of duration $T_u$ (FIG. 3) allotted to a respective subscriber station identified by the energization of a corresponding output lead $U_1, U_2, \ldots U_n$. After *n* such advances, corresponding to as many operating cycles of counter C*t*CU, counter C*t*U energizes the lead S*t*U to generate the next starting pulse S*t*. Thus, the duration of an operating cycle of counter C*t*U, indicated at $T_s$ in FIG. 2, is *n* times that of counter C*t*CU.

Leads 104 and 105 originate at consecutive phases of counter C*t*CU and are energized in the same time positions with reference to any address pulse $S_k$ (generated by the energization of lead Scr) as are the leads 204 and 205 in FIG. 4. The coincidence of a busy signal OC (FIG. 3) from any outlying station with voltage on lead 104, therefore, unblocks the gate *m* and sets a flip-flop FF' connected to the output thereof. Similarly, the arrival of a request pulse RCO (FIG. 3) over line LS during energization of lead 105 opens the gate *l* and sets a flip-flop FF'' controlled thereby. Both flip-flops are periodically reset by the energization of lead S*cr*.

Flip-flop FF'', when set, energizes a lead 106 which extends through an OR gate OP to a logic matrix LC containing conventional switching circuits for determining the availability of any channel $G_1 - G_i$ (FIG. 1) of trunk line G and selecting the first such available channel in response to an incoming request signal by energizing one of several output leads $cc_1, cc_2, \ldots cc_i$ respectively allocated to these channels. Leads $cc_1 - cc_i$ terminate at respective columns of cross-point switch MC whose rows are connected to the outputs of respective AND gates $s_1, s_2, \ldots s_n$ each having an input terminal tied to a corresponding output lead $U_1, U_2, \ldots U_n$ of counter C*t*U. Leads $cc_1, cc_2 \ldots cc_i$ are further connected by way of an OR gate OQ to the other inputs of all these AND gates. A voltage appearing on, say, output lead $cc_1$ of matrix LC during a time slot allotted, for example, to subscriber station $D_2$ (FIG. 1), as determined by the energization of lead $U_2$, therefore results in the actuation of a junction relay at the intersection between the first column and the second row of cross-point switch MC to mark the first channel $G_1$ as seized, this information being fed back to a matrix LC via a cable 101 containing the necessary number of leads.

The operation of cross-point switch MC extends the channel selected by matrix LC to one of the links $Ut_1, Ut_2, \ldots Ut_n$ leading from this switch to the central office C, i.e. the link assigned to the corresponding subscriber station. Conversely, upon energization of any of these links at the central office in response to an incoming call destined for the corresponding out-lying station, a circuit $CU_1, CU_2, \ldots CU_n$ such as a flip-flop is actuated thereby to energize one of the inputs of an associated AND gate $w_1, w_2, \ldots w_n$ whose other input is tied to the corresponding output lead $U_1, U_2, \ldots U_n$ of counter C*t*U, the outputs of all these AND gates being connected in parallel to a conductor 108 also terminating at OR gate OP. Thus, matrix LC also responds in this case with the selection of an available channel which is thereupon tied to the subscriber link by the corresponding junction relay of cross-point switch MC for the transmission of ringing current to the called station. In that case, of course, the subsequent bypassing of the loop current detector (FIG. 4) to switch a relay of the group $R_1 - Ri$ (after the subscriber of the called station has picked up the telephone receiver) does not result in the operation of another junction relay in switch MC since only one such relay at a time can be actuated in the row of the switch assigned to that station; relays $R_1, R_2, \ldots R_i$ (FIG. 4) at the subscriber station may be provided with electrical or preferably, mechanical lockout means *per se* for preventing seizure of more than one channel at a time.

A monitoring circuit $RIG_j$, individual to a channel $G_j$ representative of any one of the several channels $G_1 - G_i$, determines the current busy or idle state of that channel and feeds this information to a logic circuit $LDCC_j$ also individual thereto. Circuit $LDCC_j$ exchanges continuous information with switch MC via conductors 109*j*, 110*j* so as to be able to determine the existence of discrepancy between the position of that switch, in marking the particular channel $G_j$ as seized, and the actual state of that channel found to be idle by monitor $RIG_j$. In the presence of such a discrepancy, the corresponding junction relay of switch MC is released and a signal indicating the clearing of the corresponding subscriber row of that switch is emitted via a cable 103 to another logic circuit LDCU. The concurrent energization of one of the leads of cable 103 and of the output lead 107 of flip-flop FF' in the presence of voltage on the corresponding output lead of counter C*t*U, generates the disconnect signal DC (FIG. 3) on an output lead 111 of logic LDCU, the transmission of this signal to the respective subscriber station by way of line LS causing the release of that channel as previously described.

Such a disconnect signal will be generated whenever, owing to some malfunction, line LS carries a busy signal OC in the time slot of a subscriber not actually engaged in the transmission or reception of voice currents of other messages (e.g. dialing pulses) over any channel to another subscriber or the central office.

Naturally, unit LUC includes as many counterparts of circuits $RIG_j$ and $LDCC_j$ as there are channels $G_1 - G_i$ in trunk line G. These circuits may operate at any time to open one of the junctions of switch MC, in contradistinction to circuit LDCU which generates a disconnected signal only during phase $T_{III}$ of the time slot allotted to the station concerned.

As with conventional time-sharing systems, any of the signals occurring in phase $T_{II}$ or $T_{III}$ may be repeated during successive time slots for as long as the conditions giving rise thereto persist.

We claim:

1. A telecommunication system comprising:

terminal equipment;

a trunk line comprising a plurality of parallel channels emanating from said terminal equipment;

a number of local lines greater than the number of said channels branching off said trunk line at different locations and terminating in respective stations;

a common service line interconnecting said terminal equipment and said stations;

switch means individual to each station for establishing and discontinuing a connection between the corresponding local line and said trunk line to facilitate the exchange of messages between said stations and said terminal equipment, said switch means being operable to connect any local line to any of said channels in response to an identifying signal from said terminal equipment individually addressed to the corresponding station;

primary signaling means at said terminal equipment connected to said service line for periodically addressing each of said stations in a code individual thereto; and secondary signaling means connected to said service line at each station so addressed for controlling the associated switch means in response to command signals from said terminal equipment;

said primary signaling means comprising pulse-transmitting means for establishing a succession of scanning cycles each including a starting pulse followed by a series of address pulses characteristically different from said starting pulse;

said secondary signaling means comprising pulse-receiving means and decoding means in the output of said pulse-receiving means for detecting said starting pulse and for thereupon measuring a time interval individual to the station for conditioning said secondary signaling means to respond to an assigned address pulse at the end of said time interval.

2. A system as defined in claim 1 wherein a time slot of predetermined duration is individually allotted to each of said stations during each scanning cycle and is initiated by the address pulse assigned to the respective station, said primary signaling means comprising a master clock circuit controlling said pulse-transmitting means for establishing each time slot, said secondary signaling means comprising a slave clock circuit conditioned by said decoding means for measuring the allotted time slot in response to arrival of the assigned address pulse, the identifying signals for different channels being distinguished by their time positions in the allotted time slot.

3. A system as defined in claim 2 wherein said primary signaling means includes a source of disconnect signals coinciding with all the time positions reserved for said identifying signals, said switch means being responsive to said disconnect signals for releasing a channel previously seized in response to an identifying signal.

4. A system as defined in claim 3 wherein said secondary signaling means includes a pulse storer connected to said signal-receiving means for generating a channel-release signal in response to a succession of disconnect signals.

5. A system as defined in claim 5 wherein said terminal equipment includes channel-monitoring means and each of said stations is provided with a transmitter of busy signals connected to said service line and operative during a specific phase of an allotted time slot upon seizure of a channel by the associated switch means, said primary signaling means further comprising verification means responsive to said busy signals and to the output of said verification means for actuating said source of disconnect signals upon coincidence of a busy signal from one of said stations with an idle condition of a channel previously seized by the corresponding switch means.

6. A system as defined in claim 5 wherein each of said stations is further provided with a generator of request signals connected to said service line and operative during said specific phase of an allotted time slot upon initiation of a call by a local operator, said request and busy signals differing from each other by their time position in said specific phase.

7. A system as defined in claim 6 wherein said terminal equipment is provided with respective storage means responsive to said request and busy signals for maintaining same registered during an entire time slot.

8. A system as defined in claim 1 wherein said terminal equipment includes a power supply for all said stations connected thereto via said service line.

9. A telecommunication system comprising:

terminal equipment;

a trunk line emanating from said terminal equipment;

a plurality of local lines branching off said trunk line at different locations and terminating in respective stations;

a common service line interconnecting said terminal equipment and said stations;

switch means individual to each station for establishing and discontinuing a connection between the corresponding local line and said trunk line to facilitate the exchange of messages between said stations and said terminal equipment;

primary signaling means at said terminal equipment connected to said service line for periodically addressing each of said stations in a code individual thereto; and secondary signaling means connected to said service line at each station so addressed for controlling the associated switch means in response to command signals from said terminal equipment, said terminal equipment including a power supply for all said stations connected thereto via said service line;

said trunk line comprising a number of parallel channels less than the number of said local lines, said switch means being operable to connect any local line to any of said channels in response to an identifying signal from said terminal equipment individually addressed to the corresponding station.

* * * * *